(12) United States Patent
Thalberg (10) Patent No.: US 12,133,517 B2
(45) Date of Patent: Nov. 5, 2024

(54) LIP DEVICE FOR FISHING LURES

(71) Applicant: Krysse AS, Oslo (NO)

(72) Inventor: Anders P. Thalberg, Greåker (NO)

(73) Assignee: Krysse AS, Oslo (NO)

( * ) Notice: Subject to any disclaimer, the term of this patent is extended or adjusted under 35 U.S.C. 154(b) by 0 days.

(21) Appl. No.: 17/915,898

(22) PCT Filed: Mar. 26, 2021

(86) PCT No.: PCT/NO2021/050083
§ 371 (c)(1),
(2) Date: Sep. 29, 2022

(87) PCT Pub. No.: WO2021/201687
PCT Pub. Date: Oct. 7, 2021

(65) Prior Publication Data
US 2023/0135130 A1    May 4, 2023

(30) Foreign Application Priority Data

Apr. 1, 2020   (NO) .................................. 20200394

(51) Int. Cl.
*A01K 85/00*  (2006.01)
*A01K 85/16*  (2006.01)

(52) U.S. Cl.
CPC .......... *A01K 85/1803* (2022.02); *A01K 85/16* (2013.01); *A01K 85/1807* (2022.02)

(58) Field of Classification Search
CPC . A01K 85/16; A01K 85/1803; A01K 85/1807
See application file for complete search history.

(56) References Cited

U.S. PATENT DOCUMENTS 2,036,075 A * 3/1936 Peterson ................ A01K 85/16
43/42.47
2,437,523 A   3/1948 Hahn
(Continued)

FOREIGN PATENT DOCUMENTS

JP       0652444 U     7/1994
JP    2004275157 A    10/2004
(Continued)

OTHER PUBLICATIONS

NO Application No. 20200394, filed Apr. 1, 2020, Norwegian Search Report, Date of Report Sep. 2, 2020 (2 pages).
(Continued)

*Primary Examiner* — Richard G Davis
(74) *Attorney, Agent, or Firm* — Barclay Damon LLP (57) ABSTRACT

The disclosure relates to a lip device for use in a fishing lure for altering the lure configuration which provides different depths and pattern of travel of the lure, wherein the lip device is connectable to the lure via lip connectors. The lip device, in an embodiment, comprises: a lip activator for changing the lip angel of attack, the lip activator being connected to the lip via a lip connecting device and the lip activator being sensitive to the lure speed through water, the lip activator having a passive state and an active state wherein the passive state corresponds to a first lip configuration, and the active state corresponds to a second lip configuration.

20 Claims, 8 Drawing Sheets

(56) References Cited

U.S. PATENT DOCUMENTS

| | | | | |
|---|---|---|---|---|
| 2,753,648 | A * | 7/1956 | Paterno .................. | A01K 85/16 43/42.47 |
| 3,367,057 | A * | 2/1968 | Pond ...................... | A01K 85/16 43/42.34 |
| 6,122,854 | A * | 9/2000 | Kinnear ................. | A01K 85/16 43/42.22 |
| 6,804,910 | B1 * | 10/2004 | Sharp ..................... | A01K 85/16 43/42.22 |
| 10,028,492 | B2 * | 7/2018 | Lehl ....................... | A01K 85/16 |
| 2008/0104881 | A1 * | 5/2008 | Ito .......................... | A01K 85/16 43/42.47 |

FOREIGN PATENT DOCUMENTS

| | | | |
|---|---|---|---|
| JP | 2004057188 | A | 10/2019 |
| JP | 2019187248 | A | 10/2019 |

OTHER PUBLICATIONS

PCT/NO2021/050083, International Search Report and Written Opinion, Date of Mailing May 20, 2021 (16 pages).
EP Application No. 21780860.9, filed Mar. 26, 2021, European Search Report, Dated Mar. 19, 2024 (16 pages).

\* cited by examiner

LIP DEVICE FOR FISHING LURES

CROSS REFERENCE TO RELATED APPLICATIONS

This application is a national stage application pursuant to 35 U.S.C. § 371 of International Application No. PCT/NO2021/050083, filed on Mar. 26, 2021, which claims priority to, and the benefit of, Norwegian Patent Application No. 20200394, filed on Apr. 1, 2020. The entire contents of such applications are hereby incorporated herein by reference.

TECHNICAL FIELD

The present disclosure relates to an autonomously adjustable lip device for use in a lure for altering the lure configuration which provides different depths and pattern of travel of the lure. More specifically, the disclosure relates to an autonomously adjustable lip device for use in a lure for altering the lure configuration which provides different depths and pattern of travel of the lure as defined in the introductory parts of and claim 1.

BACKGROUND ART

A problem with the solutions of the prior art is that a lure is designed for fishing at a predefined water depth, and if the fisherman needs to alter the depth he needs to change lure, or alter the speed at which the lure is pulled through the water. Alternatively there is some lure manufacturers that provides for changing lip in a lure, such that the same lure may be configured for various depths by changing the lip to a different one having a different size, form, angle of attach a.o. A further lure manufacturer has come up with the solution of providing a lip configuration that can change the angle of attack by the fisherman between fishing sessions. None of the lures may change the lip configuration in situ. There is thus a need for improved lure lip design.

SUMMARY

It is an object of the present disclosure to mitigate, alleviate or eliminate one or more of the above-identified deficiencies and disadvantages in the prior art and solve at least the above mentioned problem. According to a first aspect there is provided an autonomously adjustable lip device for use in a lure for altering the lure configuration which provides different depths and pattern of travel of the lure, wherein the adjustable lip device is connected to the lure via lip connectors, the adjustable lip device comprising: a lip activator for changing the lip angel of attack, the lip activator being connected to the lip via a lip connecting device and the lip activator being sensitive to the lure speed through water, the lip activator having a passive state and an active state wherein the passive state corresponds to a first lip configuration, and the active state corresponds to a second lip configuration.

There is thus provided a lure that can change its configuration simply by altering the speed through water. The changed state of the lure lip enables the lure to be configured for more than one depth.

According to some embodiments, the lip activator changing from the passive state to the active state by increasing the lure speed through water above a lip activator threshold specified by the lip configuration.

The fisherman need only to increase the speed of the lure to change from a passive state to an active state, and thereby decrease the depth at which the lure travel through water.

According to some embodiments, the lip activator changing from the active state to the passive state by decreasing the lure speed through water below a lip activator threshold specified by the lip configuration.

The lip may thus be configured to change back to its original passive state and the lure is configured to travel at its original depth.

According to some embodiments the lip activator changes between the passive state and the active state dependent on the lure speed through water.

The lure then may have a more dynamic changing lip configuration, depending on the speed through water.

According to some embodiments the lip activator changes between the passive state and the active state dependent on the lure speed through water, and the lip activator comprise an activation delay device causing the lip activator action to be delayed in one or both of changing from the passive state to the active state, or from the active state to the passive state.

According to some embodiments, the lip activator is a resilient connector, such that the resilient connector causes the lip to bend in accordance with the lure speed through water.

According to some embodiments, the lip activator is a pressure sensitive snap disc connector which when activated stays in the active state for as long as pressure by is maintained in accordance with the lure speed through water and when pressure is lowered holds an active state for a period of time in accordance with the snap disc configuration, and then snaps back to the passive state.

According to some embodiments, when the snap disc snaps back to the passive state the snap action transfers into an alteration of the lure movement pattern.

According to some embodiments, the lip activator is a hydraulically attenuated damper which changes from passive state to active state and stays in active state when the lure speed through water reaches above a threshold value, and changes with delayed action back from active state to passive state when the lure speed through water first changes below the threshold value.

According to some embodiments, the lip activator changes from passive state to active state and stays in active state when the lure speed through water reaches above a threshold value, and changes back from active state to passive state and stays in passive state when the lure speed through water first changes below the threshold value and then increase above the threshold value.

According to some embodiments, the lure runs at a configurable depth when lip activator is in the passive state, and the lure runs at a configurable shallower depth when lip activator is in the active state.

The lure thus may be configured for a variety of alterable movement through water characteristics, and a solution to the above stated problems is solved.

According to some embodiments, the lip connecting device is arranged inside the lure, and is one of:
  an action rod
  a first pivot arm, and
  a second pivot arm,
  wherein the pivot arms rotate around a pivot point and the distal end of the first pivot arm is connected to the lip base, and the and the lip activator being connected to one of:
    the front of the second pivot arm
    the back of the second pivot arm the front of the first pivot arm
the back of the first pivot arm
the pivot point.

According to some embodiments, the lip connecting device and the lip activator is arranged partly or completely on the outside of the lure.

According to some embodiments the lip activator is a spring device arranged in one or more of the lip connectors.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Terminology

The term "lip" is to be interpreted as any type of lure maneuver device also encompassing what is normally called lure bib, foils, wing, or any device altering or defining the depth/movement pattern characteristics of a lure.

The term "spring" is to be interpreted as any type of elastic bodies that can be twisted, pulled, or stretched by some force. They can return to their original shape when the force is released. In other words it is also termed as a resilient member.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1A:
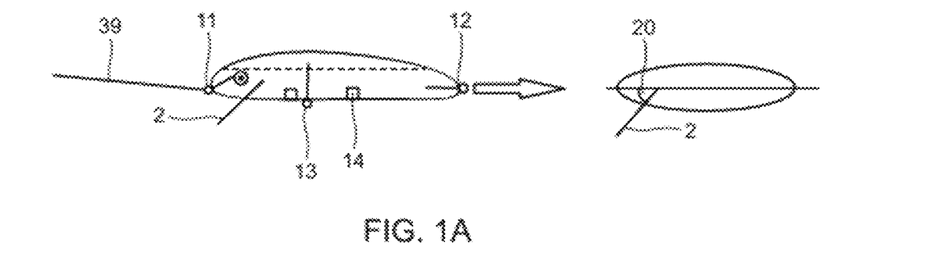
FIG. 1A shows a side view of a prior art lure having a static lure lip configuration.

FIG. 1 shows a typical lure 1 of prior art, having a fixed lip/bib 2 for a predefined lure path/depth through water when attached to a fish line 39 and pulled through water. A lure will have hook attachment devices 12, 13, and weight/floats 14, and this is the same for the lures of present invention, but for simplicity these are not included in the simplified sketches of embodiments discussed. The fishing of lures according to prior art are predefined to follow the characteristics defined at production. Some lures has been provided to comprise the possibility to change li configuration between fishing sessions which to a small degree enables the fisherman to alter the configuration of his lure.

It is an objective of present invention to provide a wobbler/lure that provides the fisherman with more ways to use the bait, more flexibility and new patterns of movement.

A lure designed in accordance with present invention will be able to cover the work areas for both shallow diver and surface lure whenever the fisherman wants to alter the configuration, in situ, meaning the solution may be built into a shallow diver and by activation the lure is altered to a surface lure, or for example a deep diver is reconfigured in situ to a shallow diver, wherein an activation feature is built into a deep diver and is activated by the fisherman upon lure draw pattern, or by the lure for example hitting an obstacle such as a the bottom.

The first aspect of this disclosure shows an autonomously adjustable lip device 3 for use in a lure 10 for altering the lure configuration which provides different depths and pattern of travel of the lure, wherein the adjustable lip device 3 is connected to the lure 10 via lip connectors 22, the adjustable lip device 3 comprising: a lip activator 6 for changing the lip angel of attack to an angle of, or between, a first passive angle 20 and a second active angle 20', the lip activator 6 being connected to the lip via a lip connecting device 7,7', 7",8 and the lip activator 6 being sensitive to the lure speed through water 21, the lip activator 6 having a passive state 3,4 and an active state 3',4 wherein the passive state corresponds to a first lip configuration, and the active state corresponds to a second lip configuration.

Figure 2A:
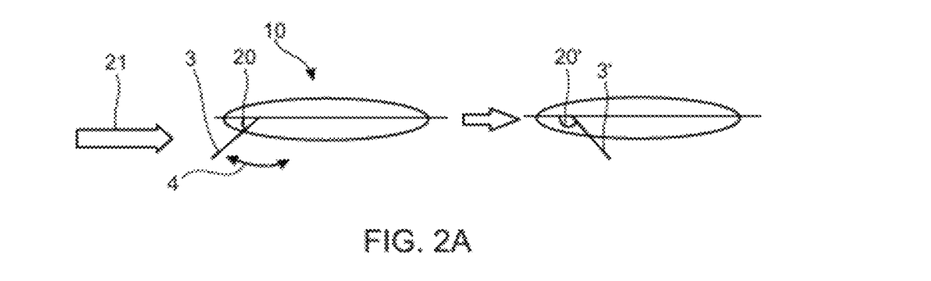
FIG. 2A shows a side view according to an embodiment of the present invention.
Figure 2B:
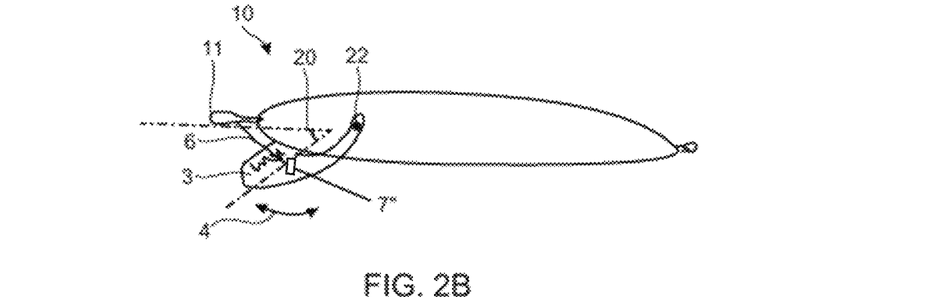
FIG. 2B shows another side view of the embodiment of FIG. 2A.

One such is shown in FIG. 2B, where the lip activator may in its simplest form be an elastic strip bound to the lip via a connecting point 7" at its first end, and to the lure eye/swivel 11 at the second end. When pulled through the water the angle of attach of the water will force the lip backwards, and at a certain point the lure will alter its depth characteristics. The higher the angle of attach 20, 20' the lip has the shallower the lure path through water.

FIGS. 2-6 describes variations of the lip activator 6.

Figure 7A:
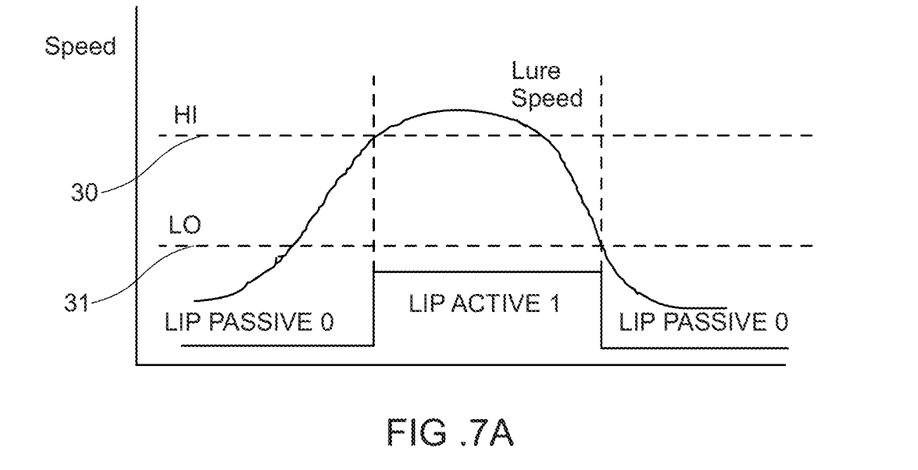
FIG. 7A shows a graph that illustrates a first activation configurations relative speed through water of the present invention.
Figure 7B:
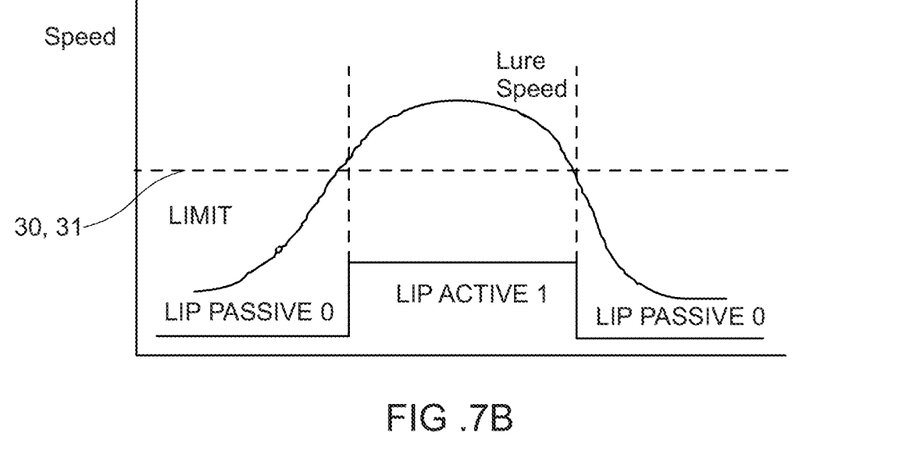
FIG. 7B shows a graph that illustrates a second activation configurations relative speed through water of the present invention.

Examples in the figures illustrates the lip activator in the form of:

FIG. 2B: spring/elastic band in front of lip see operation pattern FIG. 7B

Figure 3A:
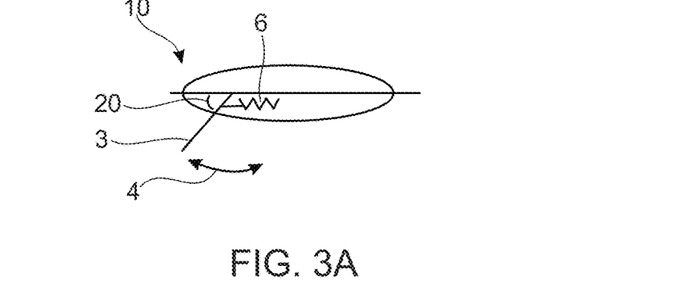
FIG. 3A shows a side view according to a further embodiment of the present invention.

FIG. 3A: spring/damper inside lure

Figure 3B:
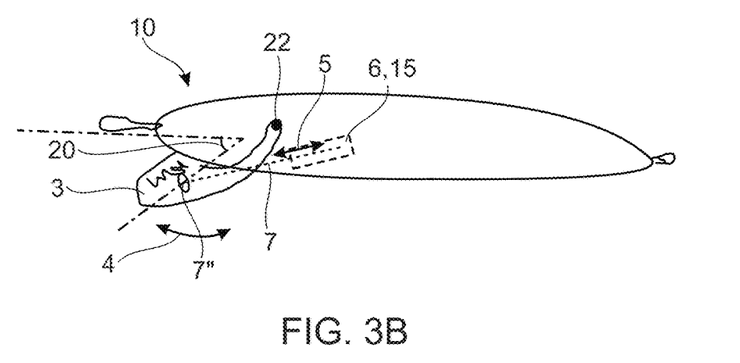
FIG. 3B shows another side view of the embodiment of FIG. 3A.

FIG. 3B: damper/switch

Figure 4A:
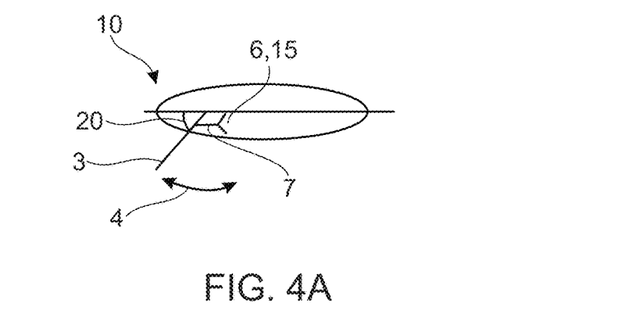
FIG. 4A shows a side view according to a further embodiment of the present invention.
Figure 4B:
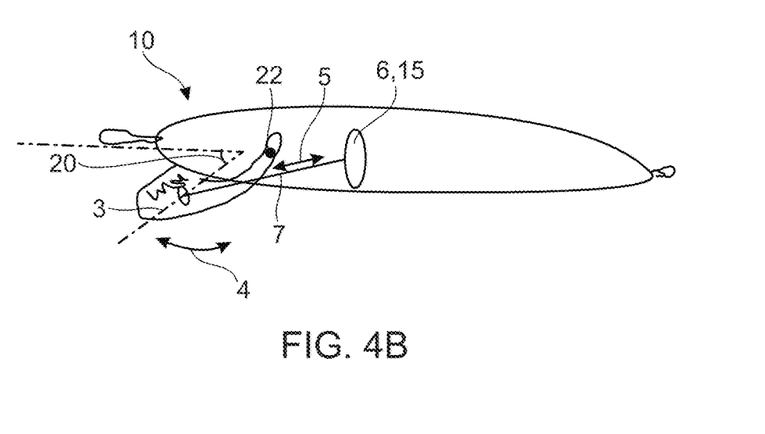
FIG. 4B shows another side view of the embodiment of FIG. 4A.
Figure 7C:
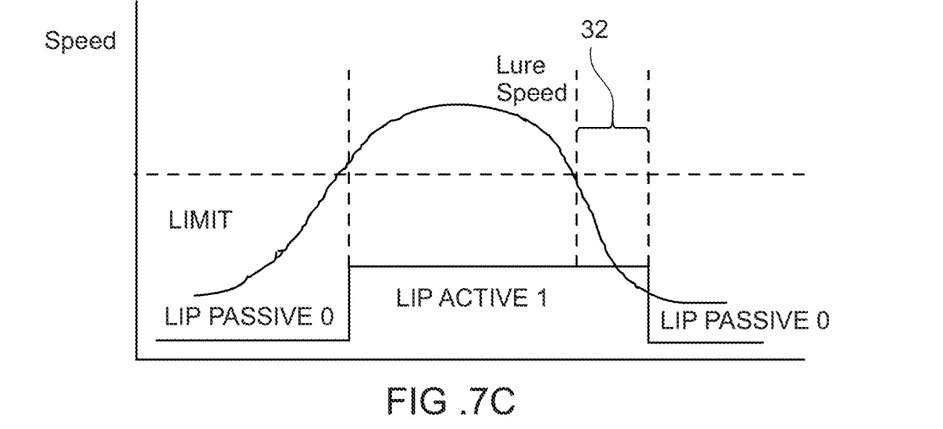
FIG. 7C shows a graph that illustrates a third activation configurations relative speed through water of the present invention.

FIGS. 4A/B: snap disc/delayed tension device see operation pattern FIG. 7C

Figure 5A:
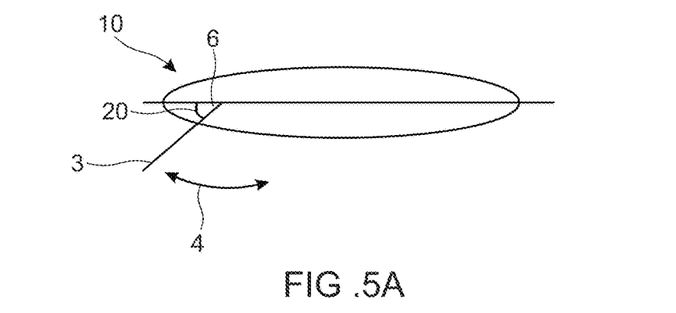
FIG. 5A shows a side view according to two further embodiments of the present invention.

FIG. 5A: resilient spring

Figure 5B:
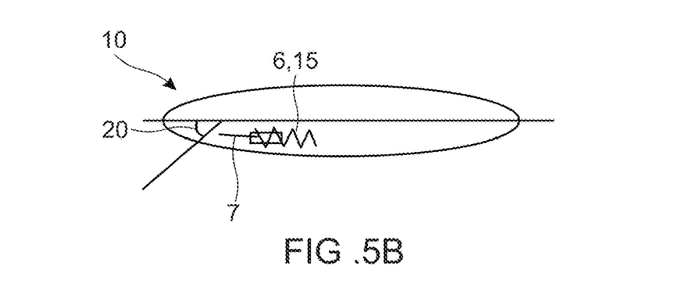
FIG. 5B shows another side view of the embodiments of FIG. 5A.
Figure 7D:
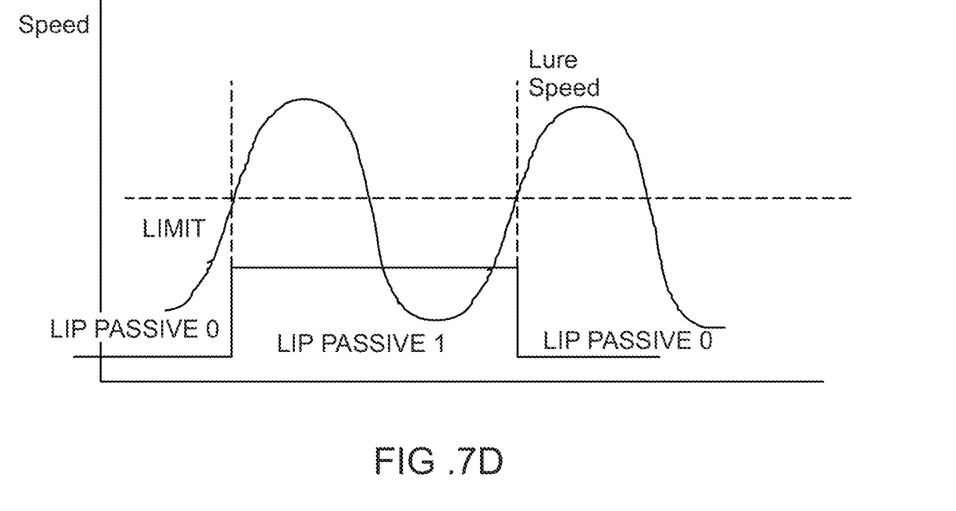
FIG. 7D shows a graph that illustrates a fourth activation configurations relative speed through water of the present invention.

FIG. 5B: click device on/off see operation pattern FIG. 7D

Figure 6A:
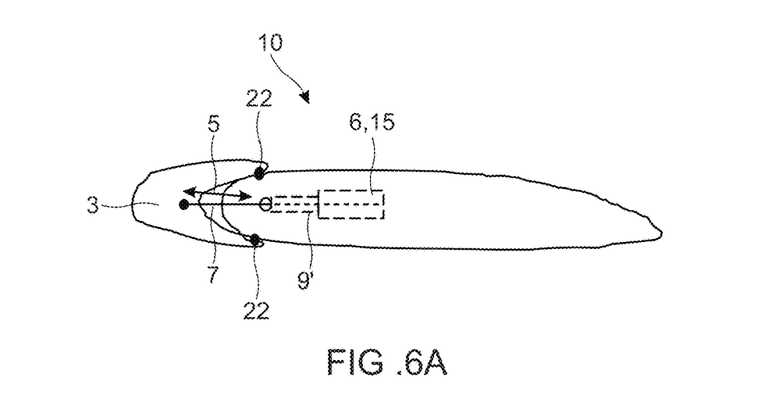
FIG. 6A shows a bottom side view according to a further embodiment of the present invention.
Figure 6B:
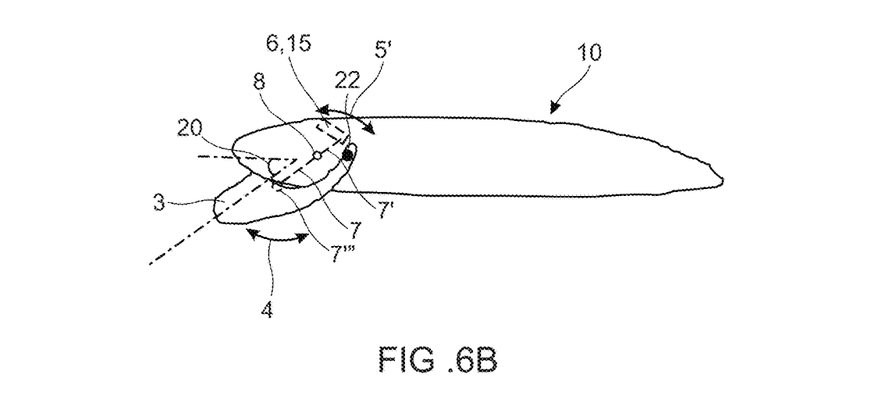
FIG. 6B shows a side view according to two further embodiments of the present invention.

FIG. 6B: lever device inside lure connected to lip, activator connected to front of upper part of lever device.

FIG. 6B: lever device inside lure connected to lip, activator connected to backside of upper part of lever device.

The lip activator 6 may in an embodiment change from the passive state 3, 4 to the active state 3', 4 by increasing the lure speed through water above a lip activator threshold 30 specified by the lip configuration.

Further, the lip activator 6 may in another embodiment change from the active state 3', 4 to the passive state 3, 4 by decreasing the lure speed through water below a lip activator threshold 31 specified by the lip configuration.

The active state corresponds to a shallower depth path of the lure, while the passive state corresponds to a deeper depth path of the lure, whilst it is pulled through the water.

The lip activator 6 may also in a further embodiment change between the passive state 3,4 and the active state 3',4 dependent on the lure speed through water.

In one embodiment the lure lip is configured such that activation is done by the fisherman "jerking" the bait (beating with a rod tip) and the water pressure on the diving lip exceeds the force needed to change the angle of it. Deactivation may be by a simple return by reducing the increased water pressure. The resulting effect may be as exemplified in the graph in FIG. 7E, that the lure may be repeatedly "jerked" from a deeper path up to the surface, and when fisherman stops the repeating "jerks", the lure returns tot the depth as defined by the lip that has returned to a passive state position.

The lip activator 6 may also in a further embodiment change between the passive state and the active state dependent on the lure speed through water, and the lip activator comprise an activation delay device 15 causing the lip activator action to be delayed 32 in one or both of changing from the passive state to the active state, or from the active state to the passive state.

In a further embodiment the lip activator 6 may also be a resilient connector, such that the resilient connector causes the lip to bend in accordance with the lure speed through water.

In a further embodiment the lip activator 6,15 may also be a pressure sensitive snap disc connector which when activated stays in the active state for as long as pressure by is maintained in accordance with the lure speed through water and when pressure is lowered holds an active state for a period of time in accordance with the snap disc configuration, and then snaps back to the passive state.

The snap disc may in one embodiment when it snaps back to the passive state the snap action transfers into an alteration of the lure movement pattern. This is meant to provide an unexpected movement of the lure.

Activation and deactivation of the lip activator 6,15 may also be arranged to provide a sound and/or vibration effects when the lip activator 6,15 changes state/angle. This may be designed to push water and/or air out of a chamber (not shown) provided in/on the lure. This may provide an effect for example such as the lure that hangs still in water suddenly shakes and/or outputs a sound and/or air bubbles, when the lip activator 6,15 change state.

In a further embodiment the lip activator 6 may be a hydraulically attenuated damper which changes from passive state to active state and stays in active state when the lure speed through water reaches above a threshold value, and changes with delayed action back from active state to passive state when the lure speed through water first changes below the threshold value.

In a further embodiment the lip activator 6 changes from passive state to active state and stays in active state when the lure speed through water reaches above a threshold value, and changes back from active state to passive state and stays in passive state when the lure speed through water first changes below the threshold value and then increase above the threshold value.

In a further embodiment the lure runs at a configurable depth when lip activator is in the passive state, and the lure runs at a configurable shallower depth when lip activator is in the active state.

In a further embodiment the lip connecting device 7,7',8 is arranged inside the lure, and is one of:

an action rod 7 a first pivot arm 7, and a second pivot arm 7', wherein the pivot arms rotate around a pivot point 8 and the distal end of the first pivot arm 7 is connected to the lip base, and the and the lip activator 6 being connected to one of:

the front of the second pivot arm 7' the back of the second pivot arm 7' the front of the first pivot arm 7 the back of the first pivot arm 7
the pivot point 8

In a further embodiment the lip connecting device 7,7',8 and the lip activator 6 is arranged partly or completely on the outside of the lure.

In a further embodiment the lip activator 6 is a spring device arranged in one or more of the lip connectors 22.

Figure 6C:
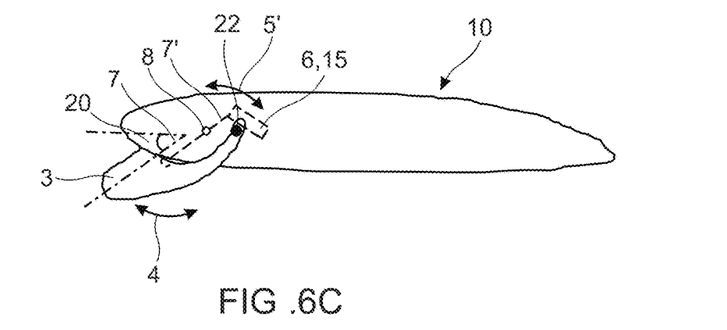
FIG. 6C shows another side view of the embodiments of FIG. 6B.
Figure 6D:
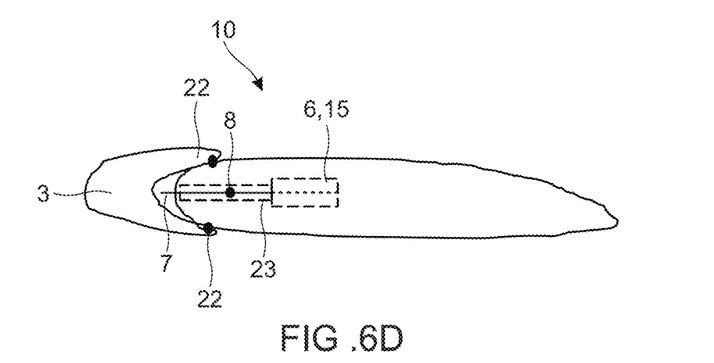
FIG. 6D shows a bottom side view according to a further embodiment of the present invention from FIG. 6B or 6C.

An embodiment of the present invention is illustrated in FIGS. 6B, 6C and 6D. The pivot arm may for example be a composed of a pivot device such as a pivot arm or a gear disc pivoting around a pivot point inside the lure. The pivot device may be arranged in a slot 23 provided for the pivot device and arranged to pivot around a pivot point 8 arranged inside the slot 23. The pivot device is connected on a first side to the base side of the lip 3 via a lip connector 7''' which will when the lip 3 rotates around its connection point 22 of the lip rotate the pivot device. The pivot device is connected on a second side to the lip activator 6 which will when the lip 3 rotates around its connection point 22 of the lip and rotate the pivot device also activate the lip activator 6. The lip activator 6 is advantageously arranged inside the lure, or in the slot 23.

The lip activator 6 may be one of, but not limited by: air/fluid damped cylinder, spring, resilient member/rubber string/strips/rope/band, jumping disc of plastic/metal/composite material, combined switching device for switching between active and passive state, and the lip activator 6 may be connected directly to the lip, the base of the lip or the front of the lip, and the connection may be direct in a connecting point, or via a connecting device.

The lip activator 6 may be arranged on or inside the lure, and when inside the connection device 7, 7' typically have one portion outside the lure connecting to the lip 3, an done portion inside the lure. In one embodiment as illustrated in FIG. 6A the connection device 7 is arranged to pass through a conduit 9' arranged from a forward positron of the underside of the lure to the lip activator 6 inside the lure.

Figure 6E:
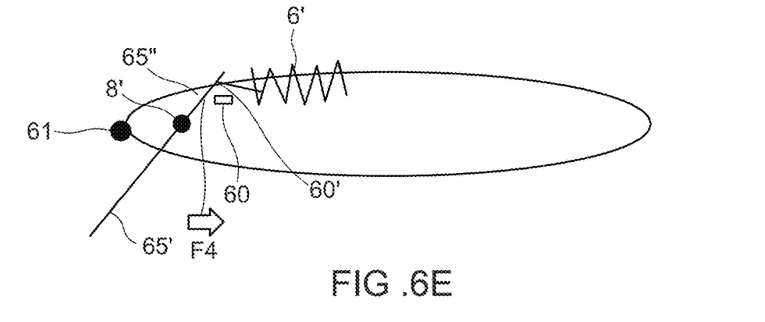
FIG. 6E shows a side view of a first further embodiment having a lip configuration with an upper and a lower part rotating around a pivot point.
Figure 6F:
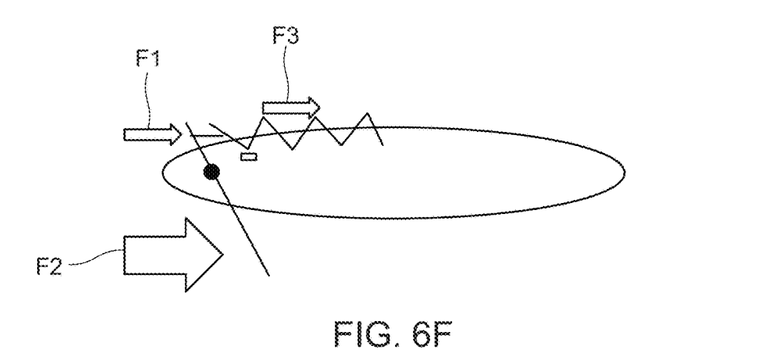
FIG. 6F shows a side view of a second further embodiment having a lip configuration with an upper and a lower part rotating around a pivot point.

In FIGS. 6E and 6F there is shown a further embodiment of present invention, wherein the lip 65', 65" is configured to comprise a larger lower portion 65' and a smaller upper portion 65", the two portions 65', 65" being rotational connected in a pivot point 8' such that when the lure is pulled through the water with sufficient speed and the lip is pushed to an active state, the upper portion 65" of the lip is moved forward and will make additional noise as it will "catch" more water or air or a mix of the two when pulled up towards a surface level. This noise is much like a conventional popper lure is designed to create when it is pulled along the water surface. The upper portion 65" and the lower portion 65' of the lure may be connected via a connecting portion 64 as seen in FIG. 6H.

The lip 65', 65" may be connected to a spring 6', the spring 6' being connected in one end to the backside of the upper portion 65" of the lip and in the other end to a point, rearward relative the upper portion 65" of the lip, on the lure, to provide a biased pulling force holding the lip in a passive position, and only when the speed of the lure through water will the lip 65', 65" move from a passive position to an active position as seen in FIG. 6F.

An additional holding force may be provided by providing a magnet 60 in the lure arranged to add to the holding forces acting on the lip 65', 65" in a passive state. The magnet 60 may be attached to the backside of the upper portion 65" of the lip, or on the front portion of the lure whereupon the upper portion 65" of the lip rests in the passive state. A cooperating magnetic metal element 60' is arranged on the other of the front portion of the lure and the upper portion 65" of the lip to enable the magnet provide a pulling force holding the lip 65', 65" in the passive state until the combined holding forces becomes less than the pushing force of the water towards the lower portion 65' of the lip. In other word in order to pull the lip out of a passive state and to an active state it is necessary to pull the lure through water at a speed such that the water resistance forces F2 on the lower portion 65' of the lip is larger than the combined water resistance forces F1 of the upper portion 65" of the lip, and the holding force F3 of the spring and the pulling force F4 of the magnet (if present). In this configuration the lure will return to passive state when the water resistance forces F1 of the upper portion 65" of the lip, and the holding force F3 of the spring 6' is larger than the water resistance forces F2 on the lower portion 65' of the lip.

The lip 65',65" may more easily reside in an in between state when moving back from active to passive state. When the fisher desires to change back from active to passive state it would be advantageous to lower the speed of the lure through water substantially in a short period. This in order for the spring 6', which will have a pulling force corresponding to its stretched out state, will be able to pull the lip 65', 65" back into passive state against the water resistance forces. The spring 6' exert less force on the upper portion 65" of the lip when in the un-stretched state and the lip is in the passive state.

FIGS. 6G to 6J show 3D prototype designs of various embodiments of present invention.

Figure 6G:
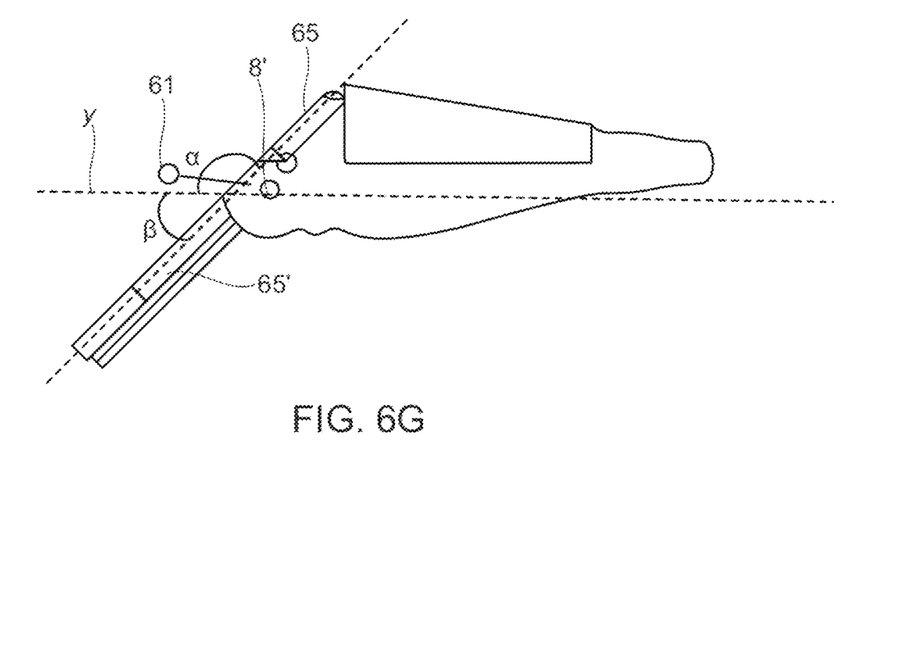
FIG. 6G shows an isometric view of a second further embodiment having a lip configuration with an upper and a lower part rotating around a pivot point.
Figure 6H:
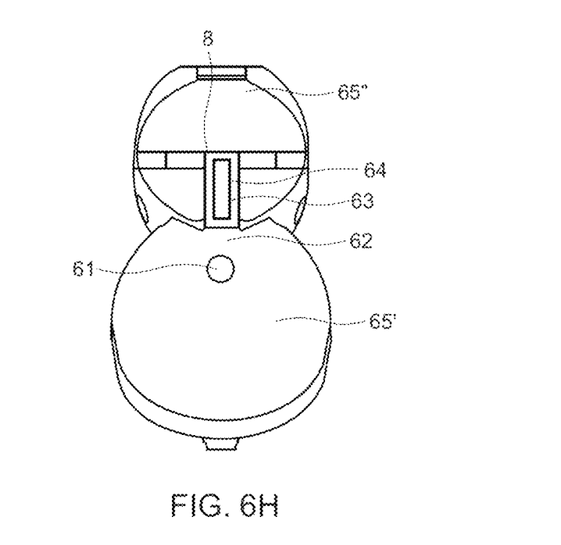
FIG. 6H shows an isometric view of a third further embodiment having a lip configuration with an upper and a lower part rotating around a pivot point.

FIG. 6G is a side view of the lure where the lure is of a wobbler type. FIG. 6H shows the same lure seen from the front when lip 65',65" is in a passive state.

Figure 6I:
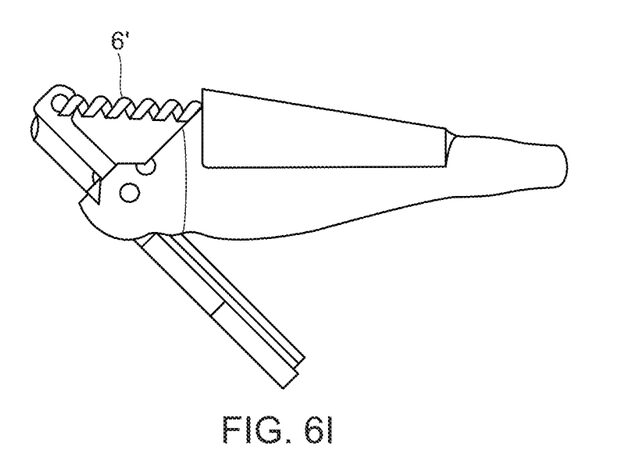
FIG. 6I shows an isometric view of a third further embodiment having a lip configuration with an upper and a lower part rotating around a pivot point.

FIG. 6I shows the lure of FIG. 6G where the lip is in an active state and where spring 6' is in an outstretched mode.

In FIG. 6G, the upper and lower portion of the lip 65', 65" are arranged on a straight line, $\alpha+\beta=180°$. In further version of this embodiment the combined angle may be different from 180°, for example the angle of the upper portion 65" of the lip may have a larger angle $\alpha$ relative the longitudinal direction y of the lure body, and the combined angle $\alpha+\beta$ may larger than 180°. The latter combination may provide a more vertical position of the upper portion of the lip when in an active state. This may create more popping/disturbance of water/air when in an active state. Other angles may be provided.

As seen in FIG. 6H it is provided a conduit 63 arranged in the connecting portion 64 of the lip 65', 65" to enable a connecting element 62 to be inserted and in a first end of the connecting element 62 is fixed to the lure body behind the lip 65', 65". The other end of the connecting element 62 may be provided with a line connection element 61. This is merely an example of providing a connecting element for a fishing line to the lure. Other connecting mechanisms may be employed without deviating from the inventive concept.

Figure 6J:
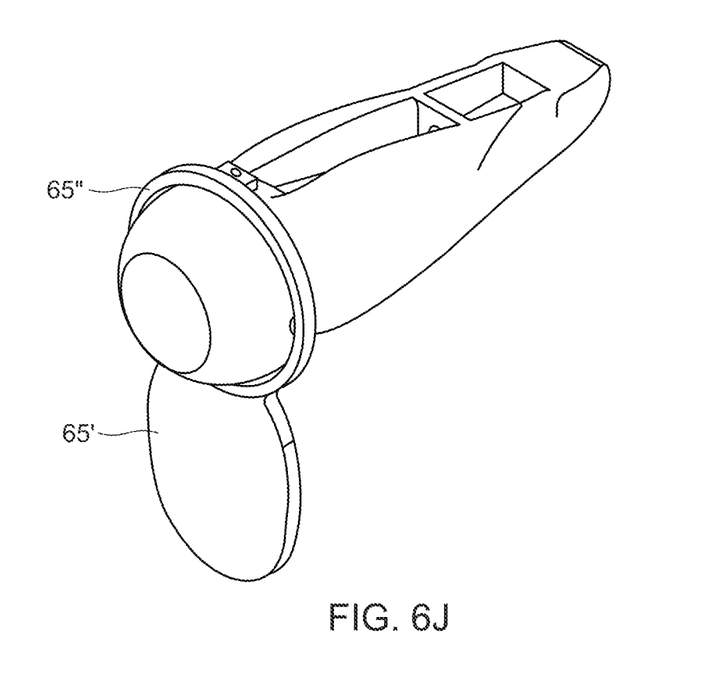
FIG. 6J shows an isometric view of a fourth further embodiment having a lip configuration with an upper and a lower part rotating around a pivot point.

In FIG. 6J a further version of the present invention is adapted to fit onto a popper lure, wherein the upper portion 65" of the lure is formed as a ring encircling the front portion of the popper lure. This example is included to illustrate that the present invention may be adapted to many types of lures that are traditionally designed for special purpose fishing, and with small adjustments the present invention may be adapted to any type of lure to achieve the described features of the invention.

In FIG. 7A a lip activator 6 has a predefined HI and LO threshold wherein the lip is in a passive state until the lure accelerates to a speed through water greater than HI, and then changes to an active state, and the lip changes back to passive state only when the speed through water falls below LO.

In FIG. 7B the activation is more directly related to the speed through water, and the state changes to an active state when the speed through water is above a LIMIT, and returns to or stays at passive states when the speed through water falls below LIMIT.

A third scenario in FIG. 7C describes one example of delayed feature, where the state changes to an active state when the speed through water is above a LIMIT, and returns to passive states after a time delay after the speed through water falls below LIMIT. The delay may be on the rising flank of speed through water or delay may be provided on both rising and descending flank of speed through water. These delay mechanisms may also be provided where the lip activator 6 operates with HI and LO thresholds as discussed above.

A further scenario in FIG. 7D describes one example where the state changes to an active state when the speed through water is above a LIMIT or HI, and returns to passive states after the speed through water first falls below LIMIT or LO and then increases above LIMIT or HI, much like a pen click-on-off feature. Delay mechanisms as discussed above may also be provided when operating on theses flanks of speed through water.

Figure 7E:
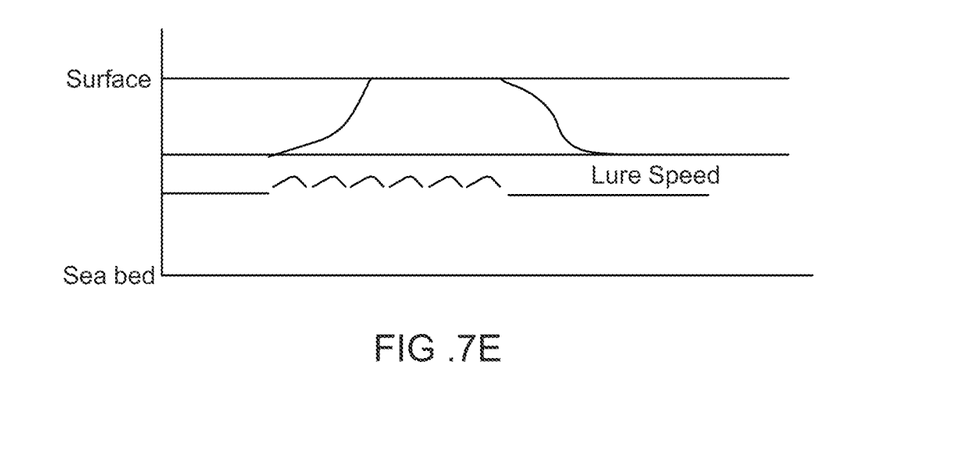
FIG. 7E shows a graph that illustrates a fifth activation configurations relative speed through water of the present invention.

The scenario from FIG. 7E is discussed above, and also this feature may be provided to operate according to the HI/LO limits and the delay options on the rising and/or descending flank of seed through water.

The person skilled in the art realizes that the present disclosure is not limited to the preferred embodiments described above. The person skilled in the art further realizes that modifications and variations are possible within the scope of the appended claims. For example, lip activator 6 may be implemented by arranging a spring in the connection point 22 of the lip 3 or of the pivot point 8 of lever device, giving the lip a resilient behavior and a movement pattern between passive and active state. Additionally, variations to the disclosed embodiments can be understood and effected by the skilled person in practicing the claimed disclosure, from a study of the drawings, the disclosure, and the appended claims.

The invention claimed is:

1. A lip device comprising:
a lip activator that is configured to control a lip of a fishing lure, wherein the lip comprises:
a pivot portion configured to pivot on a part of the fishing lure;
a lower portion extending below the pivot portion; and
an upper portion extending above the pivot portion, wherein the upper portion is smaller than the lower portion,
wherein a first portion of the lip activator is configured to be connected to the upper portion of the lip, and a second portion of the lip activator is configured to be connected to a body of the fishing lure,
wherein the lip activator is sensitive to a variable resistance force applied by water,
wherein the lip activator is configured to change from a passive state to an active state due to a lure speed through the water increasing to a level, and from the active state to the passive state due to the lure speed through the water decreasing below the level,
wherein the lip activator is configured to cooperate with the lip such that, when the lure speed of the fishing lure pulled through the water is great enough and the lip is changed to the active state, the upper portion is positioned at least partially above a surface level of the water.

2. The lip device of claim 1, wherein the lip activator is configured to change from the passive state to the active state in response to an increase in the lure speed through the water above a lip activator threshold associated with a first lip configuration.

3. The lip device of claim 1, wherein the lip activator is configured to change from the active state to the passive state in response to a decrease in the lure speed through the water below a lip activator threshold associated with a second lip configuration.

4. The lip device of claim 1, wherein the lip activator changes between the passive state and the active state dependent on the lure speed through water.

5. The lip device of claim 1, wherein the lip activator comprises a resilient member, wherein the resilient member is configured to enable the lip to pivot about the part of the fishing lure depending on the lure speed through the water.

6. The lip device of claim 1, wherein the lip activator is configured to change from the passive state to the active state and stay in the active state after the lure speed through the water increases above a threshold value, and wherein the lip activator is configured to change back from the active state to the passive state and stay in the passive state after the lure speed through the water drops below the threshold value and then increase above the threshold value.

7. The lip device of claim 1, wherein the fishing lure is configured to travel at a depth in the water when the lip activator is connected to the fishing lure in the passive state, and the fishing lure is configured to travel at a shallower depth when the lip activator is in the active state.

8. The lip device of claim 1, comprising a lip connecting device configured to connect the second portion of the lip activator to the body of the fishing lure, wherein the lip connecting device is configured to be at least partially positioned inside the fishing lure, wherein the lip connecting device comprises one of:
(a) an action rod;
(b) a first pivot arm; or
(c) a second pivot arm,
wherein the first and second pivot arms are configured to pivot around a pivot point, a distal end of the first pivot arm is connected to a lip base of the lip, and the second portion of the lip activator is configured to be connected to one of:
(a) a front of the second pivot arm;
(b) a back of the second pivot arm;
(c) a front of the first pivot arm;
(d) a back of the first pivot arm; or
(e) the pivot point.

9. The lip device of claim 1, comprising a lip connecting device, wherein each of the lip connecting device and the lip activator is positioned one of partly or completely on an outside of the fishing lure.

10. A fishing lure comprising the lip device of claim 1.

11. The lip device of claim 1, wherein the lip is configured to comprise a lip position relative to the body, wherein, in the lip position, the upper portion is located above the surface level while the lower portion is located below the surface level.

12. A lip device comprising:
a lip activator that is configured to control a lip of a fishing lure, wherein the lip comprises:
a pivot portion configured to pivot on a part of the fishing lure;

a lower portion extending below the pivot portion; and
an upper portion extending above the pivot portion, wherein the upper portion is smaller than the lower portion,
wherein a first portion of the lip activator is configured to be connected to the lip, and a second portion of the lip activator is configured to be connected to a body of the fishing lure,
wherein the lip activator is sensitive to a variable resistance force applied by water,
wherein the lip activator is configured to change from a passive state to an active state due to a lure speed through the water increasing to a level, and from the active state to the passive state due to the lure speed through the water decreasing below the level,
wherein the lip activator is configured to cooperate with the lip such that, when the lure speed of the fishing lure pulled through the water is great enough and the lip is changed to the active state, the upper portion of the lip moves at least partially toward a forward travel direction of the fishing lure,
wherein the lip activator comprises an activation delay device configured to cause a delay in one of: (a) the change from the passive state to the active state, or (b) the change from the active state to the passive state.

13. A lip device comprising:
a lip activator that is configured to control a lip of a fishing lure, wherein the lip comprises:
   a pivot portion configured to pivot on a part of the fishing lure;
   a lower portion extending below the pivot portion; and
   an upper portion extending above the pivot portion, wherein the upper portion is smaller than the lower portion,
wherein a first portion of the lip activator is configured to be connected to the lip, and a second portion of the lip activator is configured to be connected to a body of the fishing lure,
wherein the lip activator is sensitive to a variable resistance force applied by water,
wherein the lip activator is configured to change from a passive state to an active state due to a lure speed through the water increasing to a level, and from the active state to the passive state due to the lure speed through the water decreasing below the level,
wherein the lip activator is configured to cooperate with the lip such that, when the lure speed of the fishing lure pulled through the water is great enough and the lip is changed to the active state, the upper portion of the lip moves at least partially toward a forward travel direction of the fishing lure,
wherein the lip activator comprises a pressure sensitive snap disc connector configured to maintain the lip activator in the active state for as long as a pressure level is maintained in accordance with the lure speed through the water, wherein, when the pressure is lowered below the pressure level, the lip activator holds the active state for a period of time connector, and then changes back to the passive state.

14. The lip device of claim 13, wherein when the pressure sensitive snap disc connector is configured to snap back to the passive state so that the snapping causes an alteration of a movement pattern of the fishing lure.

15. A lip device comprising:
a lip activator that is configured to control a lip of a fishing lure, wherein the lip comprises:
   a pivot portion configured to pivot on a part of the fishing lure;
   a lower portion extending below the pivot portion; and
   an upper portion extending above the pivot portion, wherein the upper portion is smaller than the lower portion,
wherein a first portion of the lip activator is configured to be connected to the lip, and a second portion of the lip activator is configured to be connected to a body of the fishing lure,
wherein the lip activator is sensitive to a variable resistance force applied by water,
wherein the lip activator is configured to change from a passive state to an active state due to a lure speed through the water increasing to a level, and from the active state to the passive state due to the lure speed through the water decreasing below the level,
wherein the lip activator is configured to cooperate with the lip such that, when the lure speed of the fishing lure pulled through the water is great enough and the lip is changed to the active state, the upper portion of the lip moves at least partially toward a forward travel direction of the fishing lure,
wherein the lip activator comprises a hydraulically attenuated damper configured to cause a change from the passive state to the active state, wherein the lip activator stays in the active state after the lure speed through the water exceeds a threshold value, and the lip activator changes with delayed action back from the active state to the passive state after the lure speed through the water drops below the threshold value.

16. A lip device comprising:
a lip activator that is configured to control a lip of a fishing lure, wherein the lip comprises:
   a pivot portion configured to pivot on a part of the fishing lure;
   a lower portion extending below the pivot portion; and
   an upper portion extending above the pivot portion, wherein the upper portion is smaller than the lower portion; and
one or more lip connectors, wherein the lip activator comprises a spring device that is at least partially positioned in one or more of the lip connectors,
wherein a first portion of the lip activator is configured to be connected to the lip, and a second portion of the lip activator is configured to be connected to a body of the fishing lure,
wherein the lip activator is sensitive to a variable resistance force applied by water,
wherein the lip activator is configured to change from a passive state to an active state due to a lure speed through the water increasing to a level, and from the active state to the passive state due to the lure speed through the water decreasing below the level,
wherein the lip activator is configured to cooperate with the lip such that, when the lure speed of the fishing lure pulled through the water is great enough and the lip is changed to the active state, the upper portion of the lip moves at least partially toward a forward travel direction of the fishing lure.

17. A lip device comprising:
a lip activator that is configured to control a lip of a fishing lure, wherein the lip comprises:
   a pivot portion configured to pivot on a part of the fishing lure;
   a lower portion extending below the pivot portion; and an upper portion extending above the pivot portion, wherein the upper portion is smaller than the lower portion, wherein a first portion of the lip activator is configured to be connected to the lip, and a second portion of the lip activator is configured to be connected to a body of the fishing lure, wherein the lip activator is sensitive to a variable resistance force applied by water, wherein the lip activator is configured to change from a passive state to an active state due to a lure speed through the water increasing to a level, and from the active state to the passive state due to the lure speed through the water decreasing below the level, wherein the lip activator is configured to cooperate with the lip such that, when the lure speed of the fishing lure pulled through the water is great enough and the lip is changed to the active state, the upper portion of the lip moves at least partially toward a forward travel direction of the fishing lure, a magnet configured to be attached to a backside of the upper portion of the lip, or on a front portion of the fishing lure, and a cooperating magnetic metal element positioned on: (a) the front portion of the fishing lure if the magnet is attached to the backside; or (b) the backside if the magnet is attached to front portion to enable the magnet provide a pulling force holding the lip in the passive state until the pulling force becomes less than a pushing force of the water towards the lower portion of the lip.

18. A lip device comprising:

a lip activator configured to be coupled to a fishing lure, wherein the fishing lure is configured to travel at a speed within water, wherein the fishing lure comprises:
(a) a lure body; and
(b) a lure lip that is movably coupled to the lure body, wherein the lure lip is configured to affect a depth at which the fishing lure travels within the water, wherein the lure lip is variable between first and second lip positions relative to the lure body, wherein the lure lip comprises a first lip portion, a second lip portion, and pivot lip portion located between the first and second lip portions, wherein the pivot lip portion is configured to pivot on a part of the fishing lure, wherein the lure lip is coupled to the lure body so that, when the lure lip comprises one of the first or second lip positions, the first lure portion is located above a surface level of the water while the second lure portion is located below the surface level, wherein the lip activator comprises:
a first portion configured to be coupled to the lure lip; and
a second portion configured to be coupled to the lure body, wherein the lip activator is configured to enable the lure lip to reposition in response to a change in the speed, wherein the lip activator is configured to change between a passive state and an active state in response to the speed deviating from a threshold, wherein the passive state corresponds to the first lip position, which is associated with a first depth in the water, wherein the active state corresponds to the second lip position, which is associated with a second depth in the water, wherein the first depth differs from the second depth.

19. A fishing lure comprising the lip device of claim 13.

20. The lip device of claim 18, wherein the first lure portion is smaller than the second lure portion.

* * * * *

UNITED STATES PATENT AND TRADEMARK OFFICE
CERTIFICATE OF CORRECTION

PATENT NO. : 12,133,517 B2
APPLICATION NO. : 17/915898
DATED : November 5, 2024
INVENTOR(S) : Anders P. Thalberg Page 1 of 1

It is certified that error appears in the above-identified patent and that said Letters Patent is hereby corrected as shown below:

In the Claims

Column 14, Line 32 Claim 19 should read:
A fishing lure comprising the lip device of claim 18.

Signed and Sealed this
Thirteenth Day of May, 2025

Coke Morgan Stewart
*Acting Director of the United States Patent and Trademark Office*